(12) United States Patent
Verba et al.

(10) Patent No.: US 11,814,700 B2
(45) Date of Patent: Nov. 14, 2023

(54) ORGANIC ACID SOLUTION HAVING AT LEAST ONE IONIC SALT AND AT LEAST ONE ORGANIC ACID WHICH IS USED FOR RARE EARTH EXTRACTION

(71) Applicant: United States Department of Energy, Washington, DC (US)

(72) Inventors: Circe Verba, Albany, OR (US); Mark L. McKoy, Bruceton Mills, WV (US); Thomas J. Tarka, Pittsburgh, PA (US); Scott Montross, Albany, OR (US); Jonathan Yang, Corvallis, OR (US)

(73) Assignee: United States Department of Energy, Washington, DC (US)

( * ) Notice: Subject to any disclaimer, the term of this patent is extended or adjusted under 35 U.S.C. 154(b) by 0 days.

(21) Appl. No.: 17/955,731

(22) Filed: Sep. 29, 2022

(65) Prior Publication Data
US 2023/0042346 A1 Feb. 9, 2023

Related U.S. Application Data

(62) Division of application No. 17/012,858, filed on Sep. 4, 2020.

(51) Int. Cl.
*C22B 3/00* (2006.01)
*C22B 3/16* (2006.01)
*C22B 3/22* (2006.01)
*C22B 59/00* (2006.01)

(52) U.S. Cl.
CPC ............ *C22B 3/165* (2013.01); *C22B 3/22* (2013.01); *C22B 59/00* (2013.01)

(58) Field of Classification Search
CPC ......... C22B 59/00; C22B 3/165; C01F 17/10; C01F 17/17
See application file for complete search history.

(56) References Cited

U.S. PATENT DOCUMENTS 5,660,806 A * 8/1997 Fristad ............... B09B 3/80
  75/725
2020/0308667 A1 * 10/2020 Honaker ............... C22B 1/24

* cited by examiner

*Primary Examiner* — Steven J Bos
(74) *Attorney, Agent, or Firm* — Aaron R. Keith; Timothy L. Harney; Michael J. Dobbs

(57) ABSTRACT

One or more embodiments relates to a process for extracting Rare Earth Elements (REEs) from REE-bearing underclays, claystones, shales, coal-mining waste, and waste coal. In at least one embodiment the process includes contacting the REE-bearing underclays, claystones, shales, coal-mining waste, and waste coal with an Organic Acid Solution (OAS) comprising at least one organic acid and at least one ionic salt at a predetermined ambient temperature and predetermined pH; and separating the REE from the REE-bearing underclays, claystones, shales, coal-mining waste, and waste coal, forming REE+Yttrium (REY) concentrate.

8 Claims, 5 Drawing Sheets

ORGANIC ACID SOLUTION HAVING AT LEAST ONE IONIC SALT AND AT LEAST ONE ORGANIC ACID WHICH IS USED FOR RARE EARTH EXTRACTION

STATEMENT OF GOVERNMENT SUPPORT

The United States Government has rights in this invention pursuant to an employer/employee relationship between the inventors and the U.S. Department of Energy, operators of the National Energy Technology Laboratory (NETL) and site support contractors at NETL.

CROSS-REFERENCE TO RELATED APPLICATION

This Application claims the benefit of and priority to U.S. patent application Ser. No. 17/012,858 filed Sep. 4, 2020, the complete subject matter of which is incorporated herein.

FIELD OF THE INVENTION

Embodiments relate to a process for extracting Rare Earth Elements (REE) for sedimentary rocks and waste streams. More specifically embodiments relate to a process for extraction of REE in underclays, claystones, shales, coal-mining wastes, and waste coal using organic acids, salts and/or chelating compounds.

BACKGROUND

Rare earth elements (REE) are necessary for the advancement of technological and energy applications. China currently controls the world's supply and the prices of REEs. With limited economically viable domestic REE resources, supply remains a major concern for the United States. Efforts to secure a domestic source of REE require the development of efficient, cost-effective, and environmentally friendly methods for REE extraction from naturally occurring materials (e.g., mined from geologic formations), recycled products (e.g., end-of-life electronics containing REEs), and/or waste streams (e.g., coal-related by-products). Sedimentary deposits have an increased resource potential as they are often easier to mine or extract from, compared to crystalline rocks, and natural processes have often concentrated the REEs or put them into forms that are easier to extract.

Current methods and technologies either use hot (commonly 90-400° C.) inorganic acids to extract REEs from ore and other sources or use relatively strong (sometimes hot) bases and salts. For most methods, physical processes are used to concentrate the REE-bearing minerals before acids or bases are applied. And prior to this, mining, crushing and/or fine grinding are commonly performed. Large concentrations of undesirable elements (e.g., aluminum, iron, silicon), which complicate the refinement of the extracted REEs into salable products, are often extracted along with the REEs by these current practices. Given radioactive Thorium is commonly found in rare-earth minerals, Thorium is commonly extracted inadvertently, leading to costly handling and disposal problems. All of this extraction, handling and processing contributes to high unit costs for REEs.

Numerous, specific problems with existing commercial processes have to be overcome: Use of strong acids or bases, with the associated hazards to workers and the environment, and increased capital costs. Heating the ore to high temperatures (typically 90° C. to 400° C.), but suffers from the associated costs of heating fuels, worker hazards, environmental impacts, and capital costs. Co-extraction of large concentrations of unwanted elements (including radioactive Thorium) that have to be separated from the desired REEs, are limited by the associated multi-step processing costs (e.g., for infrastructure, energy), worker hazards, waste handling. Inability of U.S. producers of REEs to compete in an open market with China, with its low REE prices and ability to manipulate the world's REE market. Society's (in the U.S.) aversion to additional mining, and to mineral processing technologies that are viewed as hazardous to workers and the environment; permitting costs; ES&H compliance costs. Beneficial use of materials that are currently viewed as wastes (e.g., coal preparation plant reject materials) or as opportunities lost (e.g., shale layers and underclays that could be co-mined with the coal but are currently avoided).

In China, nearly 10,000 tons of rare earth oxide (REO) concentrate are produced annually from weathered "elution-deposits" derived from lateritic weathering of granitic rock. In-situ solution mining yields ~200 tons of REE annually at a recovery rate of 70% using inorganic acids. Despite the efficacy in extracting REEs from a variety of ore bodies, inorganic acids are commonly used, such as hydrochloric (HCl), nitric ($HNO_3$), and sulfuric ($H_2SO_4$) acids, and pose significant challenges to worker safety, wastes management and environmental impacts. Additionally, strong inorganic acids dissolve a variety of gangue minerals, leading to unwanted products at high concentrations in the pregnant leach solution (PLS) that hinder the removal and purification of the REEs into salable product.

The REE-enrichment of the Chinese clay deposits resulted from natural weathering, leaching, transport and accumulation processes that could perhaps form the basis for a commercial process designed to selectively extract and enrich REEs from certain source rocks. This could be accomplished either in a processing plant or via in-situ techniques. In 2015, researchers at the University of California at Berkeley reported that fungi were observed to extract REEs from monazite (a REE-bearing phosphate that is relatively resistant to breakdown), while leaving radioactive Thorium in place. This report triggered discussions at NETL in 2015 on the potential for combining the observations from UC-Berkeley with the Chinese geologist's descriptions of the suspected origins of REE-rich clay deposits currently being mined in China, to make a new, nature-inspired, commercial REE extraction process for coal-related clay-rich rocks, such as underclays and shale partings in coal layers.

One recently published method of leaching includes the use of a variety of acids in solution (HCl, $H_3PO_4$, $H_2SO_4$, $HNO_3$, $H_2CO_3$, halogen oxoacids, and carboxylic acids) to leach REEs from coal at 20° C.-100° C. for 60 hours. This method was limited to coal and was not mentioned as possibly working on clay-rich materials associated with coal.

A need exists in the art for extracting REE from sedimentary rocks and waste streams. More specifically a need exists for extracting REE in underclays, claystones, shales, coal-mining wastes, and waste coal. This can be accomplished using organic acids, salts and/or chelating compounds.

SUMMARY

One or more embodiments relates to a process for extracting Rare Earth Elements (REEs) from REE-bearing underclays, claystones, shales, coal-mining waste, and waste coal. In at least one embodiment the process includes contacting the REE-bearing underclays, claystones, shales, coal-mining waste, and waste coal with an Organic Acid Solution (OAS) comprising at least one organic acid and at least one ionic salt at a predetermined ambient temperature and predetermined pH; and separating the REE from the REE-bearing underclays, claystones, shales, coal-mining waste, and waste coal, forming REE+Yttrium (REY) concentrate.

Additional embodiments relate to a process for extracting REEs from REE-bearing materials consisting of underclays, claystones, shales, coal-mining waste, and waste coal. The process includes contacting the REE-bearing material with an OAS comprising at least one organic acid and at least one ionic salt at a predetermined ambient temperature <35° C. and predetermined pH between about 2 and 6; and performing at least one of solid-liquid separating, filtering, drying and calcinating. The process further includes separating the REE from the REE-bearing material, forming REE+Yttrium (REY) concentrate.

In one or more embodiments the process may further include performing at least one of solid-liquid separating, filtering, drying and calcinating. In at least one embodiment, the ambient temperature is above the freezing point of the OAS and below 35° C. and/or the predetermined pH is between about 2 and 6, more specifically between about 4 and 5, and exemplary about 5.

In at least one embodiment of the process, the OAS solution comprising the at least one organic acid and the at least one ionic salt follows the formula c(ionic salt)=0.5 mol/L and c(organic acid)=0.1 mol/L where c(ionic salt) is the concentration of ionic salt and c(organic acid) is the concentration of organic acid and the OAS solution having a pH ranging between about 2 and 6.

Other embodiments include an OAS having at least one organic acid; and at least one ionic salt, where the OAS solution follows the formula c(ionic salt)=0.5 mol/L and c(organic acid)=0.1 mol/L where c(ionic salt) is the concentration of ionic salt and c(organic acid) is the concentration of organic acid, the OAS solution having a pH ranging between about 2 and 6. The OAS solution may have a pH ranging between about 4 and 6, more specifically about 5.

One or more embodiments of the OAS solution may include a chelating compound selected from the group including carboxylic acid from acetate, citrate, and formate. The OAS solution may include at least one surfactant, inorganic acid, colloid, or biocide. In embodiments of the OAS solution, the at least one organic solution is selected from the group comprising citric acid, acetic acid, indole-3-acetic acid, gluconic acid and malic acid. The OAS solution may include at least one salt selected from the group comprising $(NH_4)_2SO_4$, NaCl and $NaH_2PO_4$.

The following documents are incorporated herein by reference in their entireties:
1. Brisson, V., Zhuang, W. Q., & Alvarex-Cohen, A. (2015) Bioleaching of Rare Earth Elements from Monazite Sand. Biotechnology and Bioengineering, 113, 2, 339-348.
2. Pradip, & Fuerstenau, D. W. (1991). The role of inorganic and organic reagents in the flotation separation of rare-earth ores. Int. J. Miner. Process, 32, 1-22.
3. Lee, J. H. & Byrne, R. H. (1993). Complexation of trivalent rare earth elements (Ce, Eu, Gd, Tb, Yb) by carbonate ions. Geochimica et Cosmochimica Acta, 57(2), 295-302.
4. Preston, J. S., Cole, P. M., Craig, W. M., & Feather, A. M. (1996). The recovery of rare earth oxides from a phosphoric acid by-product. Part 1: Leaching of rare earth values and recovery of a mixed rare earth oxide by solvent extraction. Hydrometallurgy, 41(1), 1-19.
5. Eskenazy, G. (1999). Aspects of the geochemistry of rare earth elements in coal: an experimental approach. International Journal of Coal Geology, 38(3-4), 285-295.
6. Mudd, G. (2001). Critical review of acid in situ leach uranium mining: 1. USA and Australia. Environmental Geology, 41(3-4), 390-403. Description: Review of in situ leach uranium mining, described generally using sulfuric acid chemistry and restoration of groundwater. General problems include expensive/difficult restoration, gypsum precipitation, high salinity, heavy metals, and radionuclides after restoration.
7. Shan, X., Lian, J., & Wen, B. (2002). Effect of organic acids on adsorption and desorption of rare earth elements. Chemosphere, 47(7), 701-710.
8. Pourret, O., Davranche, M., Gruau, G., & Dia, A. (2007). Rare earth elements complexation with humic acid. Chemical Geology, 243(1-2), 128-141.
9. Marsac, R., Davranche, M., Gruau, G., & Dia, A. (2010). Metal loading effect on rare earth element binding to humic acid: Experimental and modelling evidence. Geochimica et Cosmochimica Acta, 74(6), 1749-1761.
10. Tang, J., & Johannesson, K. H. (2010). Ligand extraction of rare earth elements from aquifer sediments: Implications for rare earth element complexation with organic matter in natural waters. Geochimica et Cosmochimica Acta, 74(23), 6690-6705.
11. Marsac, R., Davranche, M., Gruau, G., Bouhnik-Le Coz, M., & Dia, A. (2011). An improved description of the interactions between rare earth elements and humic acids by modeling: PHREEQC-Model VI coupling. Geochimica et Cosmochimica Acta, 75(19), 5625-5637.
12. Marsac, R., Davranche, M., Gruau, G., Dia, A., Podrot, M., Le Coz-Bouhnik, M., & Briant, N. (2013). Effects of Fe competition on REE binding to humic acid: Origin of REE pattern variability in organic waters. Chemical Geology, 342, 119-127.
13. Baral, S. S., Shekar, K. R., Sharma, M., & Rao, P. V. (2014). Optimization of leaching parameters for the extraction of rare earth metal using decision making method. Hydrometallurgy, 143, 60-67.
14. Xiao, Y., Chen, Y., Feng, Z., Huang, X., Huang, L., Long, Z., & Cui, D. (2015). Leaching characteristics of ion-adsorption type rare earths ore with magnesium sulfate. Transactions of Nonferrous Metals Society of China, 25(11), 3784-3790.
15. Peelman, S., Sun, Z. H. I., Sietsma, J., & Yang, Y. (2016). Leaching of Rare Earth Elements: Review of Past and Present Technologies. Rare Earths Industry, 319-334.
16. Rozelle, P. L., Khadilkar, A. B., Pulati, N., Soundarrajan, N., Klima, M. S., Mosser, M. M., . . . Pisupati, S. V. (2016). A Study on Removal of Rare Earth Elements from U.S. Coal Byproducts by Ion Exchange. Metallurgical and Materials Transactions E, 3(1), 6-17.
17. Kim, R., Cho, H., Han, K., Kim, K., Mun, M., Kim, R., . . . Mun, M. (2016). Optimization of Acid Leaching of Rare-Earth Elements from Mongolian Apatite-Based Ore. Minerals, 6(3), 63.
18. Xiao, Y., Feng, Z., Hu, G., Huang, L., Huang, X., Chen, Y., & Long, Z. (2016). Reduction leaching of rare earth from ion-adsorption type rare earths ore with ferrous sulfate. Journal of Rare Earths, 34(9), 917-923.
19. Kumari, A., Panda, R., Rajesh Kumar, J., Yoo, K., & Lee, J. Y. (2016). Review on hydrometallurgical recovery of rare earth metals. Hydrometallurgy, 165, 2-26.

20. Pourret, O., Davranche, M., Gruau, G., & Dia, A. (2007). Competition between humic acid and carbonates for rare earth elements complexation. *Journal of Colloid and Interface Science*, 305(1), 25-31.
21. Maes, S., Zhuang, W.-Q., Rabaey, K., Alvarez-Cohen, L., & Hennebel, T. (2017). Concomitant Leaching and Electrochemical Extraction of Rare Earth Elements from Monazite. *Environmental Science & Technology*, 51(3), 1654-1661.
22. Cao, S., Zhou, C., Pan, J., Liu, C., Tang, M., Ji, W., . . . Zhang, N. (2018). Study on Influence Factors of Leaching of Rare Earth Elements from Coal Fly Ash. *Energy & Fuels*, 32(7), 8000-8005.
23. Gergoric, M., Ravaux, C., Steenari, B.-M., Espegren, F., Retegan, T., (2018). Leaching and Recovery of Rare-Earth Elements from Neodymium Magnet Waste Using Organic Acids. *Metals*, 8(9), 721.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

Figure 1:
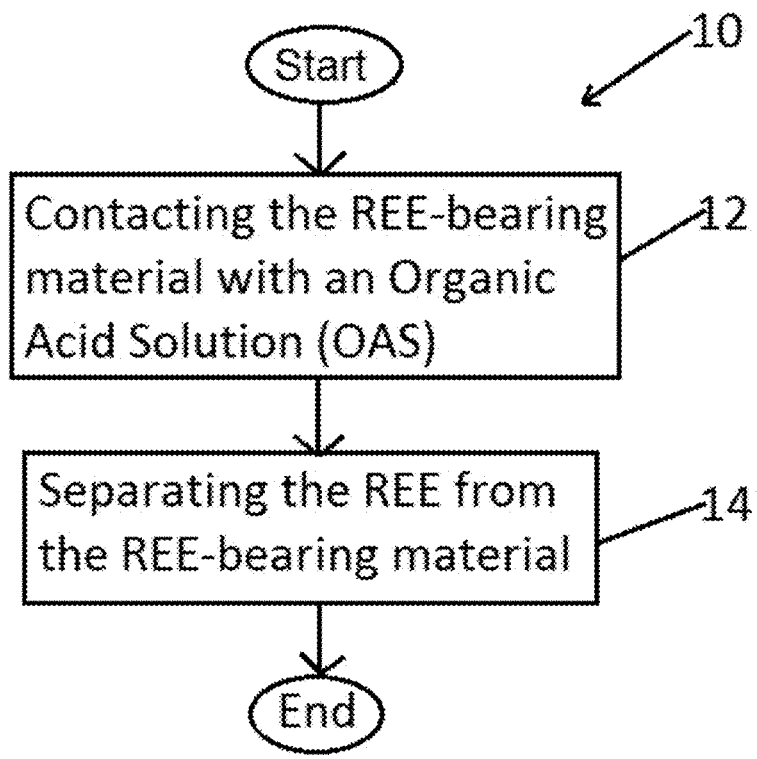
FIG. 1 depicts a flow diagram illustrating a process for extracting REEs from REE-bearing materials.

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

One or more embodiments relate to a process for extracting Rare Earth Elements (REE) for sedimentary rocks and waste streams. More specifically embodiments relate to a process for extraction of REE in underclays, claystones, shales, coal-mining wastes, and waste coal using organic acids, salts and/or chelating compounds.

One embodiment relates to a process of using organic acids and salts, in combination with chelating compounds in some cases (where the chelating compound includes one or more of carboxylic acid from acetate, citrate, and/or formate), for extracting REEs and certain other critical metals (e.g., Sc, Co, Ni) in clay-rich sedimentary rock as well as certain coal-related waste streams. A particularly attractive resource is the clay-rich rock below coal beds, known as underclays or "seat rock", as well as clay-rich rock above coal beds.

The weathering of REE-rich host rocks leads to the formation of aluminosilicate-rich clay deposits. REE ions are mobilized, transported, and can accumulate within clay-rich soil or sediments. These clay-rich ore deposits contain elevated concentrations of ion-adsorbed REEs with the balance existing in colloids (e.g., Fe, Mn-oxides) and crystalline minerals (e.g., REE-phosphates). In the geologic past, the weathering of REE-rich igneous rocks led to the formation of aluminosilicate-rich clays in soils and laterites.

As these deposits subsequently eroded, the REE-pregnant clays may have later deposited in the deltas such as those of the ancient Appalachian Basin where the clay layers, sand layers and peat layers became coal-bearing strata. In other cases, the REE ions were likely mobilized, transported (perhaps in chelated form or absorbed into colloids), and accumulated within clay-rich soil or delta deposits. REEs deposited in coal-forming peats may have subsequently mobilized vertically (either up or down, depending on hydrologic gradients) to absorb within clay-rich sediments below or above the coals, leading to further enrichment of these layers. Today these clay-rich deposits can contain up to 80-90% of their REEs in various adsorbed states (exchangeable, colloid, mineral). Organic acids offer a promising, selective extraction solution for REEs in clay-rich rocks. The optimum leaching conditions of REEs from ion-absorbed clays and other exchangeable phases is pH 4 to 5 using an ionic lixiviant and moderate temperatures (<35° ° C.).

It should be appreciated that reverse engineering nature—using dilute leaching agents, transport mediators, and concentrators found in nature—reduces hazards to workers and the environment Embodiments of the present invention minimizes contaminates extracted (such as Al, Fe, As, U, Th) and wastes. Temperature ranges of the present invention are suitable for ambient surface conditions (ranging between about 20° C.-35° C.); but other temperatures are contemplated. The use of organic acids is more economical by reducing conventional mining and processing costs (e.g., mining, crushing and grinding, heating fuel, multiple process steps), and encourages reusing coal refuse or coal mining reject materials.

This process is applicable to other geological material and REE bearing ore, including ex-situ heap leaching operations, specifically applying solution as a liquid or constituents in a powder form to low-grade ores, in addition to mechanical plant processing (tank leaching, vat leaching, autoclave leaching). Embodiments of the invention may be used with other metal ores with large adsorbed/easily accessible component (e.g., chrysocolla concretions for heap leaching copper operations).

FIG. 1 depicts a flow chart illustrating a process, generally designated 10, for extracting REEs from REE-bearing materials. The process 10 includes contacting the REE-bearing material with an Organic Acid Solution (OAS) 12. In at least one embodiment, OAS includes at least one organic acid and at least one ionic salt at a predetermined ambient temperature and predetermined pH. The method further includes separating the REE from the REE-bearing material 14, forming REE+Yttrium (REY) concentrate. In at least one embodiment of process 10, separating the REE from the REE-bearing material further includes performing at least one of solid-liquid separating, filtering, drying and calcinating.

Process 10 further includes having the ambient temperature above the freezing point of the OAS and below 35° C. (ranging between about 20° C.-35° C. for example). Further, in at least one embodiment, the predetermined pH is between about 2 and 6, more likely between about 4 and 5, in one preferred embodiment about 5. In at least one embodiment the OAS solution comprising the at least one organic acid and the at least one ionic salt follows the formula c(ionic salt)=0.5 mol/L and c(organic acid)=0.1 mol/L where c(ionic salt) is the concentration of ionic salt and c(organic acid) is the concentration of organic acid and the OAS solution having a pH ranging between about 2 and 6. In at least one embodiment of the process 10 the specific REE-bearing materials are selected from the group comprising clay rich materials, coal-mining wastes, co-mined materials, undisturbed sedimentary layers, open pits, and underground mines. In one or more embodiments of the process the group comprises ex-situ heap recovery (ESHR) from clay-rich materials, ex-situ processing plant recovery from clay-rich materials and in-situ recovery (ISR) from clay-rich materials.

The use of organic acids with salts may potentially increase the recovery of REE from clay-rich rocks by: (a) maintaining a balanced charge on clay surfaces and increasing cation exchange capacity, (b) selectively dissolving certain matrix rock constituents and increasing pore space connectivity and transmissivity of fluids, and solubilizing phosphate-bound REEs (at least from the surfaces of these mineral grains). Organic acid leaching may be used to extract REEs from porous and permeable rock and certain coal wastes; that salts (particularly monovalent salts) usually facilitate the extractions, that chelating compounds may be beneficially used in certain instances to inhibit re-absorption and further may facilitate separation of REE from the pregnant leachate; and that the reasonable range of parameters of the process allow this process to overcome the problems listed in the prior section of this ROI.

In one or more embodiments the process may apply to REE extraction in at least three common modes: 1) ex-situ heap recovery (ESHR) from clay-rich materials (including coal-mining wastes and co-mined materials): 2) ex-situ processing plant recovery from clay-rich materials (including coal-mining wastes and co-mined materials), and 3) in-situ recovery (ISR) from clay-rich materials (including in-situ extractions in undisturbed sedimentary layers, open pits or underground mines). Use of clay-rich coal-related wastes and underclay deposits may reduce environmental impacts and wastes and allow existing waste piles to be beneficially used, while subsequently reducing life-cycle costs.

Embodiments of the process selectively removes the REEs and certain other critical metals of interest using organic acid solutions (OAS=aqueous solutions containing various single acids or combinations of acids: citric, acetic, and indole-3-acetic, gluconic, or malic acids) amended with a monovalent or divalent salt (e.g., ammonium sulfate, $(NH_4)_2SO_4$, sodium chloride, NaCl), or sodium dihydrogen phosphate ($NaH_2PO_4$). The components used in each OAS solution follow the general formula: c(salt)=0.5 mol/L, c(organic acids)=0.1 mol/L; where c=concentration of the selected salt [e.g., NaCl or $(NH_4)_2SO_4$] or organic acids in the extraction solution. The basic process involves: Contacting an organic acid solution (OAS) with a clay-rich REE-source material (ore) to leach out REEs and certain other potentially useful elements. This process applies to geologic rock formations and waste products (e.g., coal high in clay, mudstone, or shale). The contact may be static (e.g., batch) or dynamic (e.g., flow through vessels). The contact may continue through time if the extraction process is economical, although the highest extraction rate usually occurs at or near the initiation of the contact between OAS and ore. Temperatures in the system must be above the freezing point of the OAS and typically, but not necessarily, below 35° C. Fluid pressures in the system may be atmospheric, reduced or elevated—the system is not expected to be highly sensitive to fluid pressure unless acid gases (e.g., $CO_2$ or $H_2S$), whether natural or introduced, significantly influence the system (e.g., carbonic acid solution of minerals along flow pathways inside ore body or ore particles).

In one or more embodiments, the OAS contains a single organic acid or any combination of organic acids in aqueous form, may include one or more salts, and may include one or more chelating compounds, surfactants, inorganic acids (usually in small concentrations), colloids, biocides, and other agents. The OAS solution input into the system preferably (but not necessarily) has a pH between 2 and 6, optimally at pH=5. Small amounts of inorganic acid or base may be used to adjust the solution pH. The following organic acids have been found to increase the extraction of REEs: citric, acetic, and indole-3-acetic, gluconic, or malic acids. $Nd^{3+}+jCH_3COO^-=Nd(OOCCH_3)_j^{(3-j)+}$, j=1, 2, 3 generalized complexation reaction between a representative REE (Nd) and citric acid. In one or more embodiments the salts have been found to facilitate the extraction of REEs: $(NH_4)_2SO_4$, NaCl, or $NaH_2PO_4$. It should be appreciated that the following salts may also facilitate the extraction of REEs by liberating or dispersing clay particles. Ideally, added salts provide monovalent cations to the solution for purposes of ion substitution at the sorption sites, clay mineral interlayer sites, and crystal lattice sites of REEs. It is also believed that the salts neutralize some of the surface force charges promoting adsorption and encourage dispersion of clay particles, allowing for more complete contact with the leachate solution. $Clay-Ln+3MX=Clay-M3+LnX_3$. Generalized ion-exchange reaction between a lanthanide adsorbed to clay surface and a monovalent salt, MX (i.e., $(NH_4)_2SO_4$ or NaCl). Extraction of the REEs from the pregnant leach solution (PLS) into salable products as rare earth oxides (REO) may then proceed through a variety of processes fairly well-established in industrial practice. Solvent extraction using organic solvents such as di-(2-ethylhexyl) phosphoric acid (D2EHPA), ethylenediaminetetraacetic acid (EDTA), tributyl phosphate, and kerosene have been shown to effectively recover the REEs from the PLS. These solvents selectively chelate/complex the REEs and allow for the separation of the REEs from base cations such as Fe and Al through the separation of the organic from the aqueous phases. Electrochemical methods may also be applied whereby a current passed through a solution induces electromigration of the REEs to the anode, where further collection and processing may continue. Certain gases and inorganic acids may be natural occurring (e.g., microbial $CO_2$) or pre-existing (e.g., sulfuric acid in pre-existing mines) within the system or may be introduced into the OAS or introduced separately from the OAS, with these either providing no benefit or various benefits (e.g., sulfuric acids from mines that also liberate REEs from ore; introduction of $O_2$ gas to facilitate sulfuric acid generation with consequent release of REEs; introduction of $CO_2$ to produce a mild carbonic acid that improves permeability of the ore). Alternative versions of the basic process would include using various combinations of organic acids, inorganic acids, salts, gases, chelating compounds, surfactants and concentrating substances tailored to maximize the extraction efficiency versus costs for a specific ore or target REE-bearing material. Testing and tailoring should be done in advance or at the beginning of every extraction project.

Experimental Studies:

Experiments conducted with 10:1 liquid-solid at 22° C. for 24 hours at pH=5 demonstrate that 0.1M citrate and 0.5M sodium chloride released comparable REE concentrations compared to 0.5M $(NH_4)_2SO_4$ (exchangeable fraction)+1M HCl (colloid fraction)+1.2M $H_2SO_4$ (mineral fraction at 70° C.) treatments which is about 33% of the total REY in the clay sample not tied to phosphate minerals. Experiments conducted with 10:1 liquid-solid at 22° C. for 24 hours at pH=5 demonstrate that 0.1M Indole-3-acetic acid treatments (with either 0.5M NaCl) demonstrate the potential use of the organic acid as a selective treatment to remove REE without disturbing the mineral structure and release of Al, Si, and other difficult elements to process such as U and Th. Final pH similar to initial pH (5-5.2). Experimental flow through tests performed at 25° C., and ~2,000 psi pore pressure, and a fluid flow rate ranging 0.03-0.05 ml/min with 0.1M sodium citrate, and 0.5M NaCl for up to 24 hours. Most size fractions (e.g. 20, 100, 230 mesh) of underclay sample make no difference to the amount of REEs extracted after organic acid treatment. Isolated clay particles (<0.002 mm) have an increased extraction efficiency. Characterization of Appalachian Basin underclay demonstrates that >55% of the underclay is made of clay identified as halloysite, kaolinite, smectite, illite with non-clay phases being quartz, K-feldspar, carbonates (calcite, siderite), and ilmenite based on quantitative x-ray diffraction. REE mineral phases included apatite $(Ca_5(PO_4)_3(F, Cl, OH))$, rhabdophane and monazite (Ce, La, Nd—$PO_4$), xenotime (Y—$PO_4$), crandallite $(CaAl_3(PO_4)(PO_3OH)(OH)_6)$. Sequential digest of underclay powders indicates that REEs are predominantly bound in residual phases that are not extractable by ion exchange alone. The high recovery by HCl digestion indicates a high proportion of REE is bound to carbonates or Fe/Mn oxides.

Ex-Situ Heap Recovery (ESHR) Example

Figure 2:
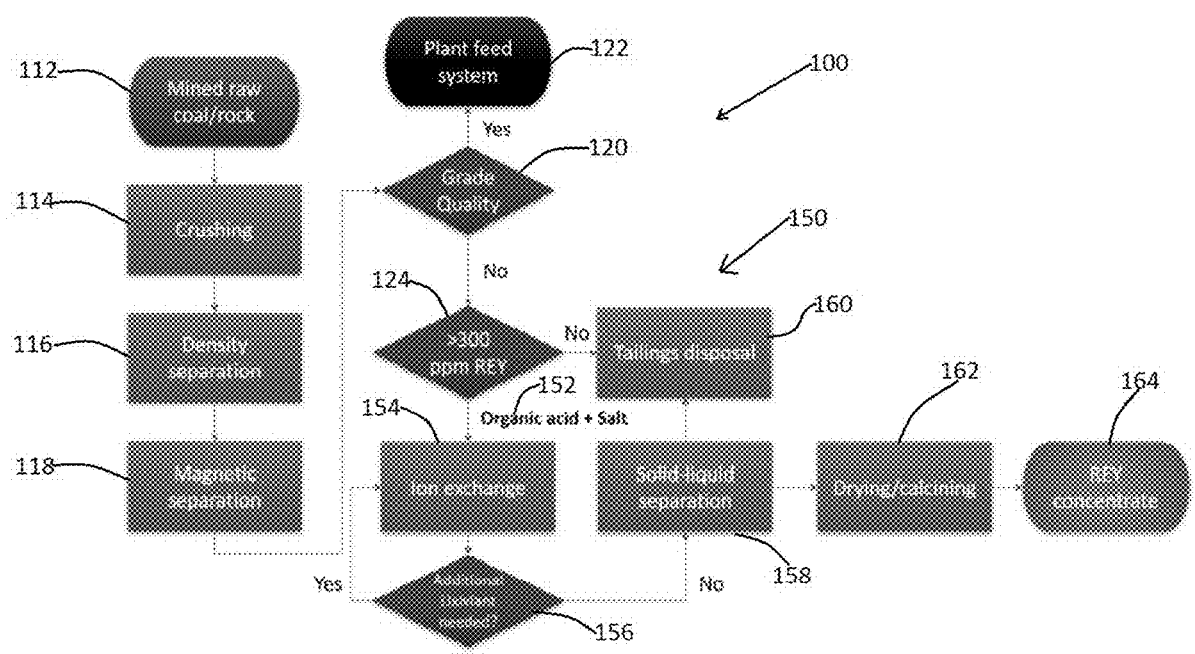
FIG. 2 depicts a flow diagram illustrating a process for ex-situ heap recovery from waste coal.

FIG. 2 depicts a flow chart illustrating a process, generally designated 100, for ex-situ heap recovery from waste coal where coal feedstock that is not grade quality for combustion and contains >300 ppm of REE+Yttrium (REY) may be considered for ex-situ heap leaching in accordance with one embodiment.

This ex-situ recovery process 100 includes the use of coal wastes as feedstock with greater than 300 ppm of rare earth elements and Yttrium (REY) to extract REEs using an ion exchange process including dilute organic acids and monovalent salt(s). In at least one embodiment the process 100 is conducted at ambient temperatures, as higher temperatures are not required to leach REEs. In this embodiment process 100 utilizes an acid to dry coal ratio ranging from 1:10 to 1:100 (g/mL) and constant pH by buffering using conjugate acid/base pairs to maintain the desired pH (4-5).

As illustrated in FIG. 2, the ex-situ recovery process 100 includes the use of coal wastes as mined rock coal/rock as feedstock 112. In process 100 the material is crushed 114, and separated by density separation 116 and/or magnetic separation 118. The process 100 determines if the material is grade quality 120. If the material is grade quality, it is provided to plant feed system 122.

If the material is not grade quality, the process determines if the material is greater than 300 ppm of REE and Yttrium (REY) 124. A portion of process 100 is generally referred to as process 150. In process 150, the organic acid and salt solution 152 contact the materials and perform an ion exchange process 154. Process 150 than determines if additional Lixiviant is needed 156. If more lixiviant is needed an additional ion exchange is performed.

Once reacted for the desired time (e.g., 24 hours), the material undergoes a solid-liquid separation 158 where the solids would be disposed of in a tailings pond 160. The leachate solution undergoes subsequent drying (or calcining) 162 forming REY concentrate 164. Batch benchtop experiments after 24 hours leached up to 35% of the REE concentration (ion absorbed clay fraction only) from the bulk material with limited release of base cations (common metals), which are considered contaminants to down-stream REE-oxide purification processes (See Table 1). This concentration is equivalent to that extracted by harsh, inorganic acids used by industry. Because there is limited iron, aluminum or silica release, there is no need for oxidation or an oxidizing agent to be added to the leachate thus limiting need for settling or filtrations. Using additional sorbent technologies is another method to further concentrate the REE by extracting REE from the leachate. Other elements and compounds—such as cobalt, copper, scandium, nickel that have high value can also be collected from the leachate.

TABLE 1

| Composition | Final pH | Al (ug/g) | Si (ug/g) | Fe (ug/g) | U + Th (ug/g) | Trey (ug/g) | % of Total Rey |
|---|---|---|---|---|---|---|---|
| $NH_4SO_4$ | 5.0 | 0.5 | 132.0 | 0.1 | 0.0 | 20.3 | 7.5 |
| HCL | 1 | 5522.9 | 3500.6 | 5686.0 | 1.3 | 51.2 | 18.9 |
| $H_2SO_4$ | 0.8 | 2169.5 | 1996.6 | 3923.0 | 1.8 | 18.4 | 6.8 |
| ΣSEQ1-3 | | 7692.9 | 5629.1 | 9609.1 | 3.1 | 89.9 | 33.2 |
| Citrate + NaCl(RS-2) | 3.5 | 1854.7 | 1178.6 | 309.0 | 1.2 | 85.2 | 31.5 |
| NaCL Only (Post RS-2) | 5.0 | 92.6 | 0.0 | 73.6 | 0.1 | 3.9 | 1.5 |
| Σ RS2-3 | | 1947.3 | 1178.6 | 382.6 | 1.3 | 89.1 | 33.0 |
| Citrate + $NH_4SO_4$ | 5.1 | 1143.2 | 837.0 | 169.0 | 0.9 | 7.3 | 2.7 |
| Citrate Only | 5.2 | 1411.0 | 924.0 | 208.0 | 1.0 | 18.3 | 6.7 |

Table 1 depicts concentrations of Al, Si, Fe, U+Th, and total REE+Y(REY) recovered from Flint underclay sample from the Middle Kittanning (West Virginia) using various leaching solutions as compared to typical sequential leaching using inorganic acids.

In-Situ Recovery (ISR) Example

Figure 3:
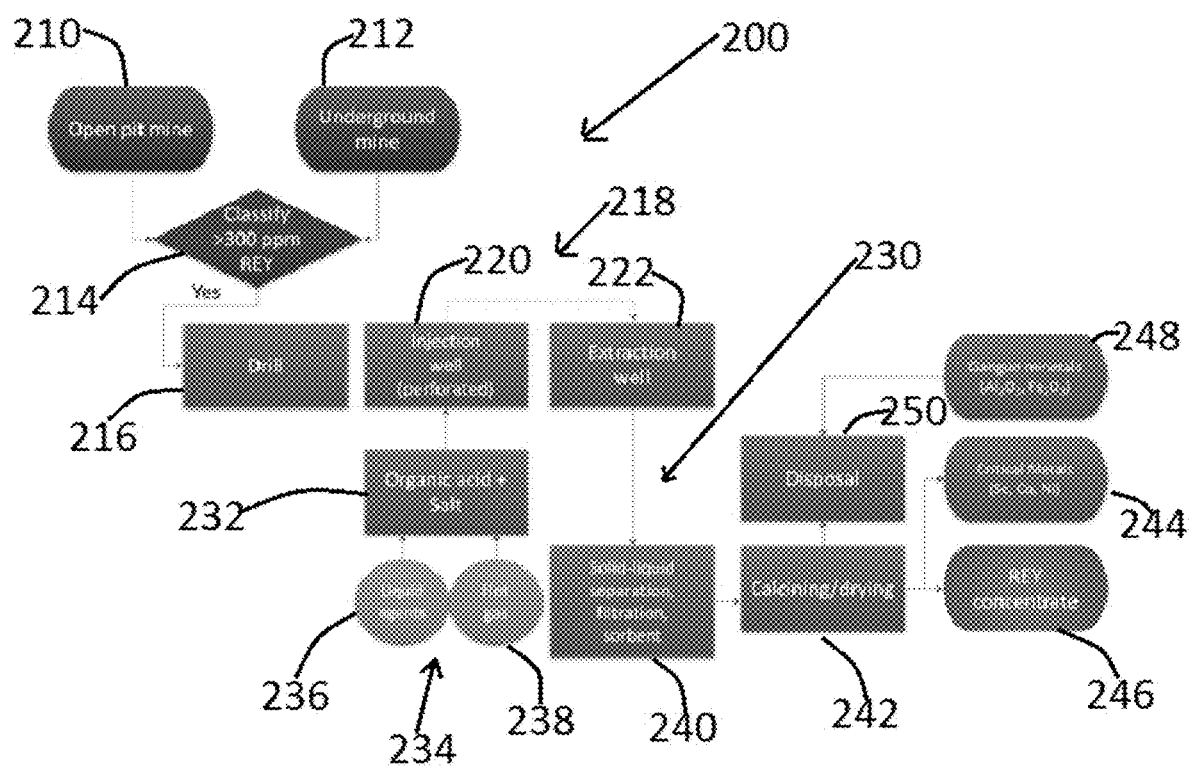
FIG. 3 depicts a flow diagram illustrating a process for in-situ extraction/recovery.

FIG. 3 depicts a flow diagram illustrating a process, generally designated 200, for in-situ extraction/recovery either in an open pit 210 or underground mine 212, in advance of mining. If the source contains greater than 300 ppm of REE+Yttrium (REY) or other critical metals 214 may be considered for in-situ recovery using either liquid or hot gas ion exchange. In-situ recovery and extraction efficiency (ISR) techniques could be deployed wherever a REE-bearing layer is underlain by a layer with at least a modest permeability. In either an open pit mine 210 or an underground mine 212, the mine floor may serve as the leachate injection point or injection production wells could be drilled and used for REE extraction in advance of mining.

The IRS efficiency for REE from geologic materials is heavily influenced by the permeation of extraction fluids into the rock matrix. In-situ extraction of REEs will drastically reduce costs by eliminating the need for grinding, crushing and conventional mining methods. Use of dilute leaching agents, transport mediators, concentrators, etc., commonly found in nature may reduce the environmental impacts and wastes, furthering reducing the life-cycle costs. One or more embodiments may include: Drill injection well(s) through the coal seam; and/or at a location vertically below the injection well(s) drill horizontal production well(s) through sandstones (or other permeable strata) immediately beneath the REE-bearing underclay or targeted ore layer.

FIG. 3 further determines whether the REY is greater than 300 ppm of rare earth elements and Yttrium (REY) 214, then the process may include drilling. FIG. 3 illustrates wells 218 including injection wells 220 and extraction wells 222 The injection well 220 for example has a casing which could be perforated where it lies within the coal bearing strata to facilitate distribution of the injected fluid throughout the area surrounding the injection well(s). Likewise, a production well may have perforated casing where it lies within the permeable layer serving the collection of leachate from the underclay or ore layer(s) above. Small-scale hydraulic stimulation of the coal seam could be used to enhance the permeability of the coal seam cleats. Injection of dilute aqueous leaching agents and flushing fluid (OAS, containing organic acids and other compounds) through the injection wells into the coal bed, where it can begin to permeate downwards. And, 3) pump periodically from the horizontal production well beneath the underclays to create a pressure gradient that facilitates gathering the leachate permeating through the underclay. The localized pressure differentials will control and limit the spread and movement the leaching solution and flushing fluid enriched in REEs such that the collateral impacts would be minimized.

Process 200 includes a portion generally referred to as process 230. In process 230, the organic acid and salt 232 contact the materials and perform an ion exchange process 234 with the option to include additional liquid agents 236 and/or hot gas 238. Material from the wells 218 is filtered 240. The filtered material 240 undergoes subsequent drying or calcining 242 forming REY concentrate 246. Calcination/drying 242 also yields critical metals 244 (e.g. Sc, Co, Ni). REY concentrate 246. Gangue minerals ($Al_2O_3$, $Fe_2O_3$) 248 may be released or produced, which may be disposed 250. Bench top experiments after 24 hours contained up to 35% of the REE from the bulk material with limited release of base cations (common gangue metals), which are considered contaminants to down-stream REE-oxide purification processes (See Table 1).

Figure 4:
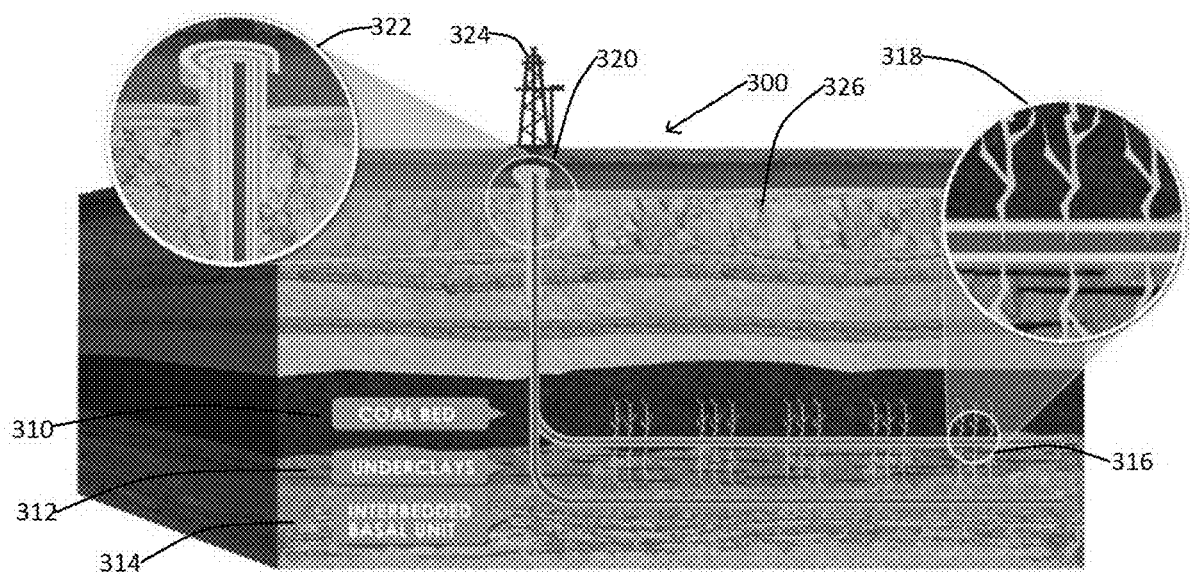
FIG. 4 illustrates one possible extraction method applied in advance of underground mining.

FIG. 4 illustrates one possible extraction in-situ recovery (ISR) method, generally designated 300 in advance of underground mining, where the REE is extracted using perforated injection and production wells. FIG. 4 includes coal bed 310, underlays 312 and interbedded basal unit 314. The injection well casing 316 is perforated (See enlarged portion 318) where it lies within the coal bearing strata 310 to facilitate distribution of the injected fluid throughout the area surrounding the injection well(s). Likewise, the production well 324 has a casing 320, a perforated casing for example (See enlarged portion 322), where it lies within the permeable layer or below the interbedded basal unit 326 serving the collection of leachate from the underclay or source material above. Small-scale hydraulic stimulation of the coal seam may be used to enhance the permeability of the coal seam cleats; Injection of dilute aqueous leaching agents and flushing fluid (OAS, containing organic acids and other compounds) through the injection wells into the coal bed, where it can begin to permeate downward; and, pump periodically from the horizontal production well beneath the underclays to create a pressure gradient that facilitates gathering the leachate permeating through the underclay. The localized pressure differentials will control and limit the spread and movement the leaching solution and flushing fluid enriched in REEs such that the collateral impacts would be minimized.

Figure 5:
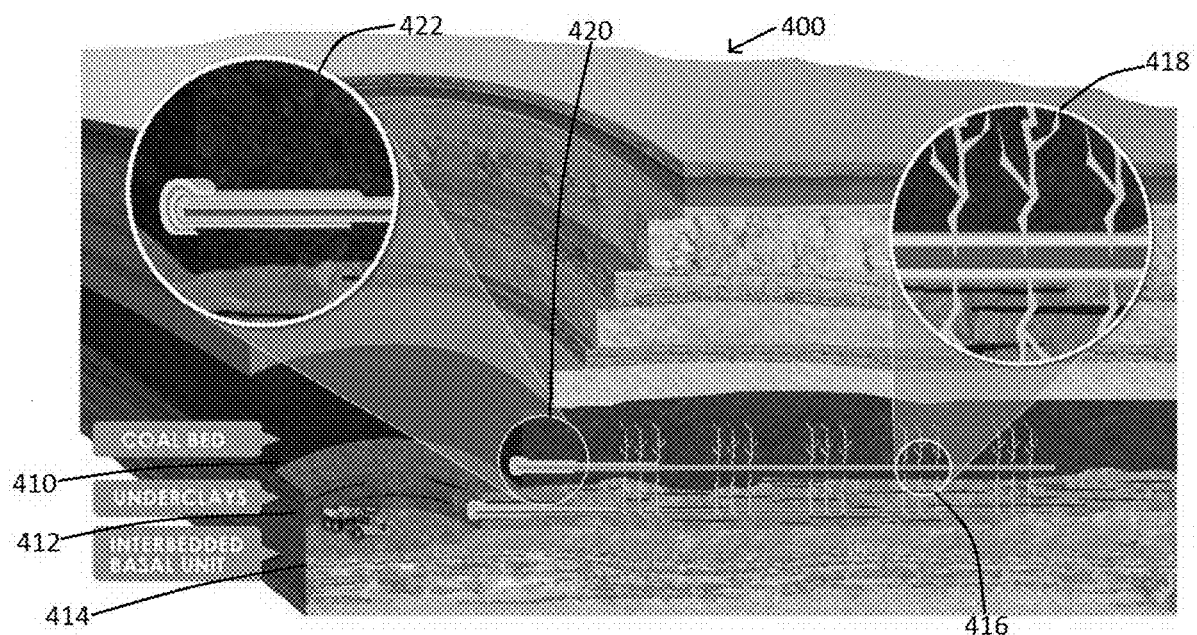
FIG. 5 illustrates one possible extraction method applied in advance of a pit mine.

FIG. 5 illustrates in-situ recovery at a pit mine, generally designated 400, which includes extracting REEs in advance of open pit mining. FIG. 5 includes coal bed 410, underlays 412 and interbedded basal unit 414. The injection well casing 416 is perforated (See enlarged portion 418) where it lies within the coal bearing strata 410 to facilitate distribution of the injected fluid throughout the area surrounding the injection well(s). Likewise production casing 420, a multi-string casing for example (See enlarged portion 422), lies below the coal bed 410 serving the collection of leachate in the underclay 412, above the interbedded basal unit 414.

One or more embodiments of the process discussed about advantageously use organic acids to enable the extraction of exchangeable, or weakly bonded (i.e., adsorbed or surface force bonded), REE ions from basal planar surfaces of clay minerals as well as liberation of non-exchangeable (stronger bonded) REE ions present as oxides at a pH ranging from 2 to 6.

It should be appreciated that the selective approach of using pH 5 buffered organic acid solutions amended with ionic salts (e.g., $(NH_4)_2SO_4$ or NaCl) is designed to facilitate the extraction of the ion-exchangeable REE fraction from the clay via cation exchange.

In one or more embodiments, NaCl may be used to create a neutral charge surface on the clay to enhance ion exchange. Additional chelation compounds may be used to keep mobilized REEs from easily re-adsorbing before being brought out of the source material or ore. One or more embodiments may use concentrating compounds to further concentrate REEs, where the chelating compound may include one or more of carboxylic acid from acetate, citrate, and/or formate. Embodiments of the present invention may be used in geological formations or other engineered waste products containing other critical metals (e.g., Sc, Ni, Co).

In-situ leaching may be performed either before conventional mining, after conventional mining, or having no association with conventional mining. Alternative versions of the basic process would include using various combinations of organic acids, inorganic acids, salts, chelating compounds, concentrating substances and surfactants tailored to maximize the extraction efficiency versus costs for a particular ore or target REE-bearing material. Testing and tailoring should be done in advance of or at the beginning of every extraction project. All natural REE-sources are different, at least at the submicroscopic level where chemical reactions, chemical bonds, and surface forces (responsible for sorption) are of greatest importance.

One or more anticipated uses include heap leaching, vat/tank or process train leaching, in-situ leaching, and uranium mining applications Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a nonlimiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. An Organic Acid Solution (OAS) comprising:
    at least one organic acid; and
    at least one salt, where the OAS solution follows the formula $c(salt)=0.5$ mol/L and $c(organic\ acid)=0.1$ mol/L where $c(salt)$ is the concentration of salt and $c(organic\ acid)$ is the concentration of organic acid, the OAS solution having a pH ranging between about 2 and 6.

2. The OAS solution of claim 1 having a pH ranging between about 4 and 6.

3. The OAS solution of claim 1 having a pH of about 5.

4. The OAS solution of claim 1 further comprising at least one chelating compound.

5. The OAS solution of claim 1 further comprising at least one surfactant, inorganic acid, colloid, and biocide.

6. The OAS solution of claim 1 where the at least one organic acid is selected from the group consisting of citric acid, acetic acid, indole-3-acetic acid, gluconic acid, and malic acid.

7. The OAS solution of claim 1 where the at least one salt is selected from the group consisting of $(NH_4)_2SO_4$, NaCl, and $NaH_2PO_4$.

8. The OAS solution of claim 4 where the chelating compound is selected from the group consisting of carboxylic acid from acetate, citrate, and formate.

* * * * *